(12) United States Patent
Leslie

(10) Patent No.: US 11,114,087 B1
(45) Date of Patent: Sep. 7, 2021

(54) AUTOMATED DIGITAL CONVERSATION MANAGER

(71) Applicant: Disruptive Multimedia, Inc., New York, NY (US)

(72) Inventor: Ryan Leslie, New York, NY (US)

(73) Assignee: Disruptive Multimedia, Inc., New York, NY (US)

(*) Notice: Subject to any disclaimer, the term of this patent is extended or adjusted under 35 U.S.C. 154(b) by 186 days.

(21) Appl. No.: 16/047,451

(22) Filed: Jul. 27, 2018

Related U.S. Application Data

(60) Provisional application No. 62/548,819, filed on Aug. 22, 2017.

(51) Int. Cl.
    *G10L 15/02*      (2006.01)
    *G10L 15/20*      (2006.01)
    *G10L 25/78*      (2013.01)

(52) U.S. Cl.
CPC ............. *G10L 15/02* (2013.01); *G10L 15/20* (2013.01); *G10L 25/78* (2013.01)

(58) Field of Classification Search
None
See application file for complete search history.

(56) References Cited

U.S. PATENT DOCUMENTS

| | | | | |
|---|---|---|---|---|
| 6,622,160 B1* | 9/2003 | Horvitz | ................ | G06Q 10/107 709/206 |
| 8,352,561 B1* | 1/2013 | Denise | .................... | H04L 51/04 709/206 |
| 9,350,565 B1* | 5/2016 | Vosshall | ................ | H04L 43/106 |
| 10,248,614 B1* | 4/2019 | Delaet | ................... | G06F 15/173 |
| 2004/0249900 A1* | 12/2004 | Karstens | ................. | H04L 51/34 709/207 |
| 2005/0080866 A1* | 4/2005 | Kent, Jr. | ................. | H04L 51/04 709/207 |
| 2005/0268237 A1* | 12/2005 | Crane | .................. | G06Q 10/107 715/732 |
| 2006/0098650 A1* | 5/2006 | Beninato | ............... | G06F 3/1222 370/389 |
| 2008/0201438 A1* | 8/2008 | Mandre | ................... | H04L 67/22 709/206 |
| 2010/0277292 A1* | 11/2010 | McGuffin | ............. | G08G 5/0013 340/309.9 |

(Continued)

*Primary Examiner* — Jonathan C Kim
(74) *Attorney, Agent, or Firm* — Fish & Richardson P.C.

(57) ABSTRACT

An example system and method for monitoring digital conversations is described. In particular, conversations are monitored for periods of inactivity, where upon identifying a particular period of inactivity, further communications are automatically generated to refresh and restart the conversations based on one or more predefined messages. In one example method, a communication target is identified, where the communication target is associated with an existing conversation. An inactivity-based rule is associated with the target and the conversation, the rule associated with an inactivity time and at least one message. Activity associated with the conversation is monitored to determine whether a time of inactivity exceeds the inactivity time. In response to determining that the inactivity time exceeds the inactivity-based rule, a new message is automatically generated and transmitted to the target based on the at least one message of the inactivity-based rule.

13 Claims, 13 Drawing Sheets

(56) References Cited

U.S. PATENT DOCUMENTS

| | | | |
|---|---|---|---|
| 2011/0302253 A1* | 12/2011 | Simpson-Anderson | H04L 51/04 709/206 |
| 2013/0294595 A1* | 11/2013 | Michaud | H04M 3/42382 379/202.01 |
| 2014/0082103 A1* | 3/2014 | Baxter, Jr. | G06Q 10/10 709/206 |
| 2014/0351719 A1* | 11/2014 | Cattermole | G06F 3/04842 715/753 |
| 2015/0207765 A1* | 7/2015 | Brantingham | H04L 51/046 715/758 |
| 2015/0215241 A1* | 7/2015 | Zhou | H04L 51/16 709/206 |
| 2015/0288640 A1* | 10/2015 | Lee | G06Q 10/10 709/206 |
| 2016/0117344 A1* | 4/2016 | Kleinpeter | G06F 16/1748 707/692 |
| 2017/0324697 A1* | 11/2017 | Bastide | H04L 51/24 |
| 2017/0374075 A1* | 12/2017 | Boval | H04L 51/22 |
| 2018/0225607 A1* | 8/2018 | Girishankar | H04L 51/14 |
| 2018/0270171 A1* | 9/2018 | Postel | H04L 63/12 |
| 2018/0270179 A1* | 9/2018 | Wren | G06Q 30/0251 |
| 2019/0140993 A1* | 5/2019 | Deets, Jr. | G06F 40/20 |
| 2020/0007493 A1* | 1/2020 | Nair | H04L 67/148 |

\* cited by examiner

AUTOMATED DIGITAL CONVERSATION MANAGER

CROSS REFERENCE TO RELATED APPLICATION

This patent claims the benefit of U.S. Provisional Application No. 62/548,819, filed Aug. 22, 2017, the entire contents of which is hereby expressly incorporated by reference herein in its entirety.

BACKGROUND

Digital communications occurs in many forms. Conversations may take place among many paths—from email to phone calls to text messages, through social network's messaging functionality, to dedicated messaging apps, among others. These conversations can be difficult to manage, and, when a high number of conversations are active, it can be easy to miss or allow many of those conversations with contacts to go forgotten and stale.

SUMMARY

An example system and method for monitoring digital conversations is described. In particular, conversations are monitored for periods of inactivity, where upon identifying a particular period of inactivity, further communications are automatically generated to refresh and restart the conversations based on one or more predefined messages. In one example method, a communication target is identified, where the communication target is associated with an existing conversation. An inactivity-based rule is associated with the target and the conversation, the rule associated with an inactivity time and at least one message. Activity associated with the conversation is monitored to determine whether a time of inactivity exceeds the inactivity time. In response to determining that the inactivity time exceeds the inactivity-based rule, a new message is automatically generated and transmitted to the target based on the at least one message of the inactivity-based rule.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 4-13 represent example screenshots of an example user interface (UI) associated with a system for monitoring digital conversations and automatically generating and transmitting further communications after a period of inactivity occurs.

DETAILED DESCRIPTION

Figure 1:
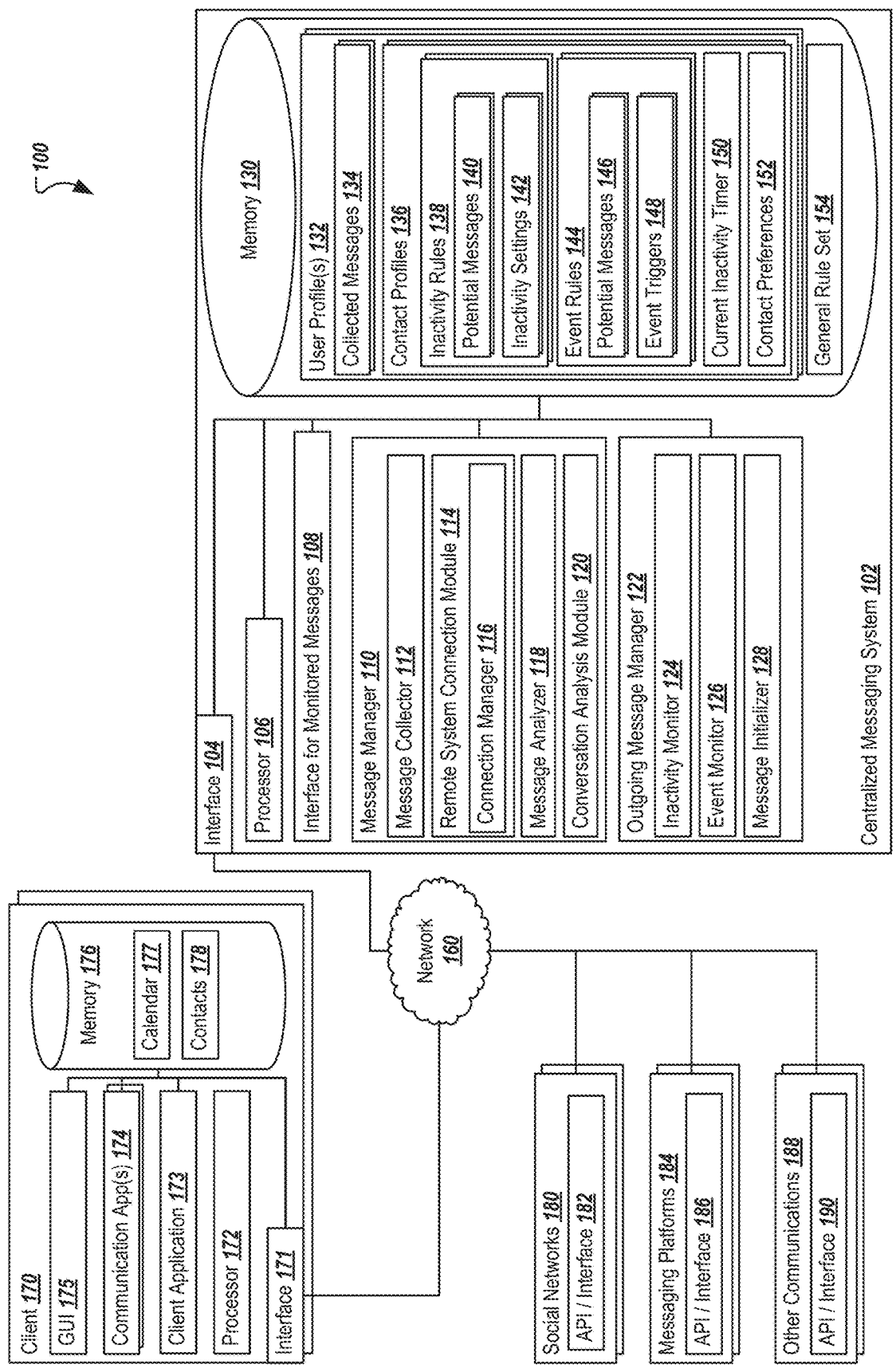
FIG. 1 is a block diagram illustrating an example system for monitoring digital conversations.

Implementations of the present disclosure are generally directed to an automated solution for monitoring digital conversations for inactivity or for a particular event, where upon identifying a particular period of inactivity or an event, further communications are automatically generated in order to refresh and restart the monitored digital conversations based on one or more predefined and/or automated rules.

The described functionality allows users to never lose touch with the people who matter most to them, including co-workers, business partners, fans, or any other relation. The system provides monitors upon one or more digital conversation channels, where conversations among a plurality of users are managed. In one implementation, a time-based inactivity tracker can be associated with a particular digital conversation occurring with a particular contact across one or more of the digital channels. While monitoring the digital conversation(s), the time-based inactivity tracker can detect how long it has been since a user has communicated with the contact via one or more of the contact's monitored digital addresses, including phone calls, text messages, social network interactions, and other suitable channels. A default or customized time interval of inactivity can be associated with particular contacts. Further, one or more messages can be associated with the particular conversation, including default or standard messages as well as customized messages specific to the contact. In response to the determined inactivity exceeding the inactivity time interval or threshold, one of the messages associated with the conversation can be automatically generated and sent via one or more of the available digital channels. In response to detecting an interaction between the user and the contact associated with the monitoring, the inactivity timer can be reset.

Alternatively, one or more events (or a dynamic event monitor) can be associated with a particular contact. For example, birthdays, anniversaries (wedding and work), promotions, press releases, and other events can be used as triggers for one or more automatic messages associated with a particular contact. Specific events can be identified for potential messages such that when those events occur—whether static dates/times or whether dynamically determined based on external information or from monitored social network activity, etc. —a corresponding message can be generated and transmitted to the contact.

The present solution is further meant to monitor and analyze recent and historical activity with one or more persons over a variety of communication channels, including one or more of text, email, direct messages, phone and voice communications, and social networking interactions, among others. For a particular user involved in a conversation with a particular user, the system can determine whether interactions have occurred across a plurality of interaction sources, systems, or channels. The solution system can then determine whether a level of inactivity is reached that exceeds an inactivity threshold. In response to such a determination, the system can generate a message that replicates the message that may have been sent by the user in an effort to reestablish a conversation that may have gone stale or otherwise dormant The present solution provides additional technical solutions and advantages. For example, the system provides automatic management of conversations held across a plurality of channels, involving different communication systems and platforms. By managing the conversations in a centralized manner, conversations are monitored and continued which otherwise would have gone stale. Because today's communication occurs over so many channels and in so many variations with many individuals and contacts, it may be difficult to identify which conversations have gone stale or otherwise withered on the vine, such as when interactions with a first contact have stopped while conversations with many other contacts have continued. The present system allows users to register and monitor various channels, considering conversations that occur across those multiple channels and determining, for specific contacts, whether a new message should be sent to ensure that communications continue and that relationships and interactions do not stop accidentally.

FIG. 1 provides an example environment 100 for implementing features of the present application. FIG. 1 as illustrated is an example environment, and can include more, fewer, or alternative components to those illustrated. Similarly, any illustrated component may be split into additional components, may share functionality with another component (illustrated or not), or may be combined with or otherwise included in functionality provided by another component (illustrated or not).

As illustrated, environment 100 includes a centralized messaging system 102, one or more clients 170, one or more social networks 180, one or more messaging platforms 182, and one or more other communication application servers or systems 188, all connected via a network 160. The centralized messaging system 102 provides a centralized location monitoring one or more communication conversations for users registered with the system. In some instances, the centralized messaging system 102 can monitor and provide access to a plurality of communication methods, including but not limited to text messaging, multimedia messaging, social network-based messaging, independent messaging applications, and other communication systems. In some instances, the centralized messaging system 102 may provide a unified inbox allowing registered users to collect and manage various communication platforms to allow for a managed experience across all participating platforms and communication means. In one example, text messages associated with a particular user and one or more social network-related messages can be collected in the unified inbox.

The centralized messaging system 102 as illustrated includes an interface 104, a processor 106, an interface for monitored messages 108, a message manager 110, an outgoing message manager 122, and a memory 130. The interface 104 is used by the centralized messaging system 102 to communicate with other systems in a distributed environment—including within the environment 100—connected to the client(s) 170, the social networks 180, messaging platforms 184, other communications systems 188, and/or the network 160, as well as other systems or components communicably coupled to the network. Generally, the interface 104 comprises logic encoded in software and/or hardware in a suitable combination and operable to communicate with the network 160 and other communicably coupled components. More specifically, the interface 104 may comprise software supporting one or more communication protocols associated with communications such that the other components, the network 160, and/or the interface's hardware is operable to communicate physical signals within and outside of the illustrated environment 100.

The network 160 facilitates wireless or wireline communications between the components of the environment 100 (e.g., between combinations of the system 102, the client(s) 170, the messaging-related systems (e.g., 180, 184, 188), and the network 160 itself, among others) as well as with any other local or remote computer, such as additional mobile devices, clients, servers, remotely executed or located portions of a particular component, or other devices communicably coupled to the network 160, including those not illustrated in FIG. 1. In the illustrated environment, the network 160 is depicted as a single network, but may be comprised of more than one network without departing from the scope of this disclosure, so long as at least a portion of the network 160 may facilitate communications between senders and recipients. In some instances, one or more of the illustrated components (e.g., including the centralized messaging system 102 itself) may be included within the network 160 as one or more cloud-based services or operations. The network 160 may be all or a portion of an enterprise or secured network, while in another instance, at least a portion of the network 160 may represent a connection to the Internet. In some instances, a portion of the network 160 may be a virtual private network (VPN) or an Intranet. Further, all or a portion of the network 160 can comprise either a wireline or wireless link. Example wireless links may include 802.11a/b/g/n/ac, 802.20, WiMax, LTE, and/or any other appropriate wireless link. In other words, the network 160 encompasses any internal or external network, networks, sub-network, or combination thereof operable to facilitate communications between various computing components inside and outside the illustrated environment. The network 160 may communicate, for example, Internet Protocol (IP) packets, Frame Relay frames, Asynchronous Transfer Mode (ATM) cells, voice, video, data, and other suitable information between network addresses. The network 160 may also include one or more local area networks (LANs), radio access networks (RANs), metropolitan area networks (MANs), wide area networks (WANs), all or a portion of the Internet, and/or any other communication system or systems at one or more locations.

The system 102 also includes one or more processors 106. Although illustrated as a single processor 106 in FIG. 1, multiple processors may be used according to particular needs, desires, or particular implementations of the environment. Each processor 106 may be a central processing unit (CPU), an application specific integrated circuit (ASIC), a field-programmable gate array (FPGA), or another suitable component. Generally, the processor 106 executes instructions, such as those stored in memory 130 or another non-transitory media, and manipulates data to perform the operations of the centralized messaging system 102, in particular those related to managing a plurality of conversations with different contacts and triggering new messages in response to the outgoing message manager identifying when automatic messages are to be sent. Specifically, the processor 106 executes the algorithms and operations described in the illustrated figures, as well as the various software modules and functionalities, including the functionality for sending communications to and receiving transmissions from the clients 170 and/or communication-related systems, as well as to other devices and systems. Each processor 106 may have a single core or multiple cores, with each core available to host and execute an individual processing thread. In some instances, a cloud-based solution may use one or more remotely or otherwise available processors and their cores to allow for further operations and optimization of operations via parallel processing.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, Objective-C, JavaScript, Java™, Visual Basic, assembler, Perl®, Swift, HTML5, any suitable version of 4GL, as well as others.

In general, particular components may be any application, framework, agent, or other software capable of performing the operations described herein. In some instances, the components may be a part of another component or providing functionality performed by a combination of different components.

The interface for monitored messages 108 may be associated with one or more monitored communication channels, and can forward communications from those different communication channels to the centralized messaging system 102 so that the centralized messaging system 102 can collect and manage those messages. In some instances, the interface for monitored messages 108 may access, with permission from the registered user, particular communication sources (e.g., the social networks 180, a messaging platform 184, text messages, etc.) to collect and/or forward the messages to the centralized messaging system 102.

The message manager 110 provides functionality associated with managing the collected messages from the one or more sources. The message manager 110 may use a message collector 112 to receive and organize messages, such as by associating particular messages with a particular user profile 132. The user profile 132 may be associated with messages from many sources/communication channels, with the message manager 110 organizing those messages for viewing in the user's unified inbox. The message manager 110 includes a remote system connection module 114, which can be associated with one or more connection managers 116, each connection manager 116 associated with and operable to connect with one or more particular communication sources. Further, the connection managers 116 and the remote system connection modules 114 can allow the centralized messaging system 102 to prepare and transmit messages through any suitable communication channel using those remote connections, as needed.

The message manager 110 further includes a message analyzer 118. The message analyzer 118 can associate received messages for a particular user with one or more contacts, each contact associated with a contact profile 136. By connecting particular messages and communications to a particular contact profile 136, communications through various communication channels can be managed under a single conversation and/or two or more related conversations associated with the same contact and contact profile 136. In doing so, activity associated with a particular contact across a plurality of communication channels can be identified and managed accordingly, including for the purposes of the inactivity monitoring. The conversation analysis module 120 is illustrated within the message manager 110, however, the module could also be associated with the outgoing message manager 122 described below. The conversation analysis module 120 can monitor interactions with different contacts, and can assist in determining a regular conversational style, a conversational frequency, and can propose default inactivity timing and/or determine whether a user-defined inactivity threshold is set too long or too short.

The outgoing message manager 122 provides the functionality associated with monitoring conversations for a particular inactivity amount or a monitored or scheduled event so that a new message can be triggered. As illustrated, an inactivity monitor 124 may be available to monitor interactions with a particular contact (and associated with a particular contact profile 136). The inactivity monitor 124 can identify one or more inactivity rules associated with different contacts, and monitor those conversations to determine whether the specified level of inactivity is met or exceeded. In response to doing so, the inactivity monitor 124 can trigger the message initializer 128 to generate a message to be sent. An event monitor 126 may perform similar operations that are based on a particular event or occurrence having been identified. In response, the event monitor 126 can notify the message initializer 128 that a new message is to be triggered.

The message initializer 128 can receive notifications from the inactivity monitor 124 and/or the event monitor 126 and determine that a new message is to be generated and transmitted to the contact corresponding to the notification. In some instances, the message initializer 128 can identify the contact associated with the notification and review the contact profile 136 of that person. The contact profile 136 can include a set of inactivity rules 138 (or alternatively, a set of event-related rules 144), including one or more potential messages 140, 146 to be sent in response a notification from the monitors. The message initializer 128 can select one of the potential messages 140, 146 randomly, sequentially, or can generate a new message based on any particular rules or patterns defined by the system or the registered user. In some instances, particular messages 140, 146 may be selected or generated based on a particular contact's role or relationship to the registered user.

The centralized messaging system 102 includes the memory 130. In some implementations, the system 102 includes a single memory 130 or multiple memories 130. The memory 130 may include any type of memory or database module and may take the form of volatile and/or non-volatile memory including, without limitation, magnetic media, optical media, random access memory (RAM), read-only memory (ROM), removable media, or any other suitable local or remote memory component. The memory 130 may store various objects or data, including caches, classes, frameworks, profiles, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the centralized messaging system. Additionally, the memory 130 may store any other appropriate data, such as VPN applications, firmware logs and policies, firewall policies, a security or access log, print or other reporting files, as well as others. As illustrated, memory 130 includes, for example, a plurality of user profiles 132. Each user profile 132 may be associated or store various collected messages 134. Those messages 134 can be managed to be associated with particular contacts or contact profiles 136, with messages 134 being collected from different sources (e.g., text messages, social network messages, etc.). Additionally, each user profile 132 may include a plurality of contact profiles 136 associated with particular contacts of that user. Each contact profile 136 may be associated with inactivity rule(s) 138 and/or an event rule(s) 144, where those rules 138, 144 define when automatic messages 140, 146 can be generated without user input or interaction as described herein. The inactivity rules 138 can define a set of inactivity settings 142 that determine when a level of inactivity should trigger a new message. One or more potential messages 140 can be associated by default, can be custom defined, or can be dynamically programmed for completion at the time a message is to be sent. The set of event rules 146 can define a set of event triggers 148 that can trigger a new message, also with a set of potential messages 148 to be sent in response to an event trigger 148 occurring or being detected.

As illustrated, each contact profile 136 can be associated with a current inactivity timer 150. The current inactivity timer 150 can be reset each time an interaction with the associated contact (associated with a contact profile 136) is identified by the message manager 110 and/or the outgoing message manager 122 over any of the connected communication platforms, or otherwise identified by the system 102 (including based on outside or external information not associated with a particular communication, such as information about a particular calendar event attended with the contact, or a social network check-in with the contact but without further communication, among others). In some instances, the current inactivity timer 150 may be associated with a timestamp of the last conversation action or interaction with the contact, with the inactivity monitor 124 comparing a current time to the timestamp to determine if an inactivity threshold defined in the inactivity settings 142 has been met or exceeded.

The contact preferences 152 may identify a particular communication channel that may be preferred to the contact for future automatic messages. In some instances, the preferred channel may be a channel in which a majority of conversations/interactions with that contact take place or have previously taken place. If the contact is also a registered user of the centralized messaging system 102, that contact may set or assign a particular preference. Other preferences, such as a time for such messages to be received, may also be set to avoid the sending of messages at an inconvenient time specific to that contact.

The general rule set 154 stored in memory may include global rules and/or preferences apart from a specific contact or a specific registered user, which may be used as a default when no specific contact rules are in place or otherwise set.

The illustrated system 102 includes at least one client 170, and may include a plurality of the clients 170 in some instances. The clients 170 may generally be any computing device operable to connect to or communicate within the environment 100 via the network 160 using a wireline or wireless connection. In general, each client 170 comprises an electronic computer device operable to receive, transmit, process, and store any appropriate data associated with the system 100 of FIG. 1. The client can include one or more client applications 173 as well as one or more communication applications 174. In some instances, the client 170 may comprise a device that includes an input device, such as a keypad, touch screen, or other device(s) that can interact with the client application 173, the communication application 174, and other functionality, and an output device that conveys information associated with the operation of the applications 173, 174 and their application windows to the user of the client. Such information may include digital data, visual information, or a graphical user interface (GUI) 175, as shown with respect to the client. In general, the client 170 comprises an electronic computer device operable to receive, transmit, process, and store any appropriate data associated with the environment 100 of FIG. 1. Each client 170, further, may be associated with a registered user and/or a particular contact of that registered user. In many instances, the client 170 may be a mobile device, including but not limited to a smartphone, a tablet computing device, a laptop/notebook computer, a smartwatch, or any other suitable device. Alternatively, the client 170 may be a desktop computer or any other suitable system.

The clients 170 may include an interface 171 and processor 172 similar to or different from those of the centralized messaging system 102. The client application 173 may be an agent or app associated with the centralized messaging system 102, and can be used to collect and forward (and/or provide access to) messages and interactions managed by the client itself (e.g., text messages, phone calls, etc.) to the centralized messaging system 102. The communication application(s) 174 may be associated with one or more communication platforms, including social networks 180, messaging platforms 184, specific application-based messaging systems, and/or other communication systems 188. In some instances, the client application 173 may be granted access to calendars 177 and contacts 178 stored in the memory 176 (which may be similar to or different from the memory 130 of the centralized messaging system 102), and can be provided to the centralized messaging system 102 for enhancement and additional information. In some instances, the client application 173 may provide a view of the centralized messaging system unified inbox, and can allow registered users to interact with their various communication streams and conversations, as well as to set particular inactivity- and event-based rules 138, 144. While the calendars 177 and contacts 178 are illustrated in memory 176, at least a portion of those calendars 177 and contacts 178 may be stored in alternative locations, including in cloud-based accounts associated with the user of the client 170 (e.g., Gmail, Google Calendar, Google Contacts, Microsoft Outlook.com and Outlook 365, etc.), as well as associated with one or more social networks 180 (e.g., Facebook, LinkedIn, etc.) which include contact lists and calendars and to which the centralized messaging system 102 has access or is otherwise provided information In some instances, the entirety of the client may be web-based, not mobile device-based. In those instances, a web-based client can be used without the need for tethering or information from the mobile device. In other instances, a combination of clients may be available, and can combine information from web- and cloud-based services as well as information stored on a user's device. In some instances, enterprise accounts may be incorporated into the process, and can be used to determine and monitor conversations, contacts, and related events.

The social networks 180, messaging platforms 184, and other communication systems 188 can be systems used for communications. Any suitable systems may be used, and can include traditional social networks such as Facebook, Instagram, LinkedIn, and Snapchat, and messaging platforms such as Facebook Messenger, Apple iMessage, WhatsApp, Slack, Skype, Google Hangouts, Twilio, and Viber, among others. Additionally, direct messaging and other similar communication methods within particular social networks 188 may be used for communications. Where communications are encrypted in an end-to-end manner, the user may provide the decrypted message to the centralized messaging system 102, or may allow the client application 173 to do so. In other instances, any encrypted messages may not be provided in their clear text format to the centralized messaging system 102, instead providing only information on the sender and receiver, as well as a time of the communication. Similarly, any other messages and communications may not be provided fully to the centralized messaging system 102, with only metadata or description information being provided. This may be, for example, how voice calls/interactions are handled, where the parties to the interaction are identified along with a time of the interaction. Any other suitable communication channel or network can be included, including web-based email platforms (e.g., Gmail, Hotmail, etc.), corporate or private email networks, online calendar or contacts lists, or any other suitable source. An interface or API (182, 186, 190) may be associated with each of the communication channels, or an agent of the centralized messaging system 102 may be able to access and analyze communications performed by the registered users. In doing so, any suitable account associated with a registered user may be used, where appropriate, as part of the centralized messaging system 102 and the inactivity and/or event analysis.

As described, communications from one or more of these sources may be associated with a particular user profile 132. Additionally, the one or more communication applications 174 executed locally on the client associated with a particular user and user profile 132 (e.g., a standard SMS application) may also be provided to the centralized messaging system 102. In some instances, the centralized messaging system 102 may provide a dummy or forwarding phone number or user name to users, where users can receive text or other messages through that dummy or forwarded phone number. The centralized messaging system 102 can store the received message 134 and forward the received text or other message accordingly, allowing for a simplified sharing with the centralized messaging system 102.

In some instances, interactions or events that are monitored by the system 102 may be from sources and/or channels that are not those that may be used for communication within the messaging initializer 128. That is, the source of information related to when an interaction occurs may be from a phone call, a voice chat occurrence, or social media that is monitored, but is not able to be used for responding by the outgoing messaging manager 122. In those instances, an indication, event, or other signal may be identified by the message manager 110 (e.g., via the remote system connection module 114), and can be used to update the contact profile 136. In some instances, a new message or other event may be added to the collected messages 134 reflecting the interaction or event, and can be used to identify the interaction such that the current activity timer for a particular contact profile 136 is reset. Those outside interactions and events may be captured or identified in any suitable manner, including by adding an event emitter or similar component at a 3rd-party source (e.g., associated with a particular social network, which may sent events or information when particular events or interactions occur), or by an agent or application that is provided access to a user's account with a 3rd-party system, and which can monitor and determine when interactions occur.

In some instances, individual interactions may be scored based on a type of interaction, as well as on a quality of an interaction. For example, the centralized messaging system 102 may perform an analysis of the interactions to determine whether the interaction should be considered an interaction for purposes of resetting an inactivity timer for a particular contact profile 136. In one example, a quick "Happy Birthday" message on Facebook may not be considered a valid message or interaction that resets the inactivity timer 150. However, a detailed comment in response to a post or article posted by a contact may meet such a threshold. The message analyzer 118 can perform an appropriate analysis using a scoring rule set, and in some cases, may incorporate artificial intelligence and machine learning to determine whether the interaction or event satisfies the communication or interaction threshold. In some instances, the scoring rule set may be dynamic in that the system can monitor and understand a user's interaction styles and the relative importance or quality of an interaction. As more input is received, the system can determine that "Happy Birthday" messages are only delivered to persons of importance to the user, and may be more detailed or associated with follow up communications. Some communications may be considered full and triggering communications, while other short replies or interactions that do not usually lead to further communications are not considered triggering interactions. In other instances, certain types of interactions may be scored differently, or provided different weights. For example, a phone call may be provided a first score, while a meeting may be provided a second score. Those scores can determine whether the inactivity timer should be reset to 0, reduced by an amount, or otherwise paused for a certain time.

Various different events and activities may be associated with actions that can be used to trigger and reset the inactivity timers for a particular contact. Phone and other voice-based interactions can be associated with a triggering activity. Those activities may be identified by a particular client application 173 used to analyze activity at the client 170, or information can be pulled or obtained from a voice provider, such as a phone company or voice chat app provider. Alternatively, a platform or service providing the voice communications (e.g., Google Hangouts, Apple FaceTime, Microsoft Skype, or other services) can be accessed or adapted to provide information to the centralized messaging system 102 when such interactions have occurred. In some instances, scores and analyses of phone or voice conversations can be based on a length of the phone discussion, as well as the content of the discussion. If capturing or recording the conversation, a sentiment analysis of the communication or a content or contextual analysis can be performed. In some instances, a comparison to historical calls and interactions can be made to determine whether the voice interaction meets the length, sentiment, or content requirements to be considered a triggering call to reset the inactivity timer.

Various types of messaging interactions may be captured as described herein, including text messaging, either through SMS or MMS messaging, as well as through one or more text messaging platforms (e.g., WhatsApp, etc.). Direct messaging and private messaging via one or more platforms (e.g., Instagram, Twitter, Facebook, etc.) may also be used. In some instances, sentiment analysis may be performed on individual communications, or could be analyzed in context with other interactions with the same person and/or different persons. Prior interactions may also be analyzed to evaluated the type of current communication or interaction and provide an appropriate score, such as to determine whether the interaction should be a triggering interaction and reset the current inactivity timer 150.

Social media interactions can be analyzed, both private messaging activity as well as actual interactions in comments and/or related to check-ins or other posting. Interactions in public sections of the sites, when those interactions are determined to be meaningful (e.g., based on a machine learning-based analysis of the interaction in light of other interactions of the user and/or based on the content and/or context of the interaction), can be considered suitable contact. For example, a post or comment on Facebook or LinkedIn involving direct interaction between the user and the particular contact may satisfy the trigger requirements and reset the current inactivity timer 150. Indirect interactions, such as "likes", retweets, or other non-direct interactions, may not be considered triggering interactions. In some instances, a comment on a post without a responsive comment from the contact may not be considered a triggering event. In some instances, using an "@" message in Twitter, may satisfy the triggering requirement, as well as a post onto a contact's wall on Facebook. A comment on a prior post, without further interaction, may not qualify, however, in some instances. Various thresholds can be set by the user or automatically determined by the centralized messaging system 102.

In some instances, calendar events and analysis of the calendar can be used to determine whether triggering events or interactions have occurred. In some instances, information can be pulled directly from a user's calendar 177 as described herein. In those instances, if a particular contact is included in a calendar invite, then the current inactivity timer 150 for that person may be reset. In some instances, the invitee must accept the invite and actually attend (or not have the calendar event be cancelled) for the triggering to occur. Scoring or evaluation of the event can be based on whether all parties are present at the meeting, and in some cases, may require confirmation or verification of attendance at the meeting. For example, location-based information may be obtained or derived from the contact's mobile device, social media check-ins or posts, or other suitable context. Further, the calendar event may be evaluated to determine whether the meeting represents a one-on-one personal meeting, a telephone conference, or a large group meeting. In the large group meeting, the necessary interaction to trigger a reset to the inactivity timer 150 may not be sufficient and may not reset the timer. Any suitable rules and analysis can be applied to meetings and calendar entries.

In some instances, the settings for threshold inactivity timers for particular contacts may be changed based on prior interactions with those contacts, as well as the user's own historical interactions with various persons. For example, the inactivity settings 142 for some users may differ between particular users. The time between automatic follow-up messages for a first contact may differ as compared to the time for a second contact. Those different times may be based on an analysis of conversational histories of the parties, such as where interactions between the first contact and the user are more frequent than interactions with the second contact. In those instances, a shorter time may elapse before the automatic interaction is triggered with the first user than the second user, as that time corresponds to the normal conversational history of the persons. Those times may change over time, as relationship dynamics change.

To perform these operations, the system 100 may further include a sentiment analyzer used to evaluate communications and the sentiments expressed in particular communications, such as based on word usage, speed patterns, and tone of voice, among others. Intimate sentiments identified during an interaction may trigger a reset of an inactivity timer 150, while generic or disinteresting sentiments may not.

Additionally, system 100 may sometimes include a contextual analyzer, which may be included in or associated with the message analyzer 118. The contextual analyzer can review and consider an interaction and determine a context and quality of the interaction. The analysis may be based at least in part on historical interactions with the same contact. In some instances, the analysis may consider the timing and type of historical interactions with the context, as well as historical interactions with other contexts, to determine whether the interaction or event is sufficient to trigger a reset of the current inactivity timer.

In some instances, system 100 may include a scoring engine used to generate a relative score that is applied to newly identified communications, interactions, and events. The scoring engine can incorporate the message analysis, including any sentiment and contextual analysis, and generate a relative score. The relative score can be compared to a threshold score, where relative scores exceeding the threshold score are considered triggering interactions and can reset the inactivity timer 150. Scores below the threshold may not be sufficient to cause the inactivity timer 150 to be reset, and can be discarded or ignored by the system 102. Alternatively, different levels of scoring may modify the current inactivity timer 150 by different amounts. For example, higher scored events may clear a current inactivity timer 150, such as where a quality interaction is identified. When a lower-scored interaction is identifier, the current inactivity timer 150 may not be reset, but may be reduced by a smaller amount. For instance, if a current inactivity time is 3 days, and a new low value interaction is identified, instead of resetting the timer 150 to "0 days", the timer may be set to "2 days". This partial change can reflect that an interaction has occurred, and can allow those interactions to delay an automatic initiation of a message using the present system.

Automatic responses may be sent using any suitable channel, although some preferences or dynamic determination may be used to choose a specific channel to use. In some instances, a last used interaction channel may be used to send the automatic interaction. In other instances, a most used channel, based on prior interactions, may be used. In some instances, a default channel may be selected by the user, or determined based on a user's preferred or most frequent channel. In other instances, the contact's most-used channel may be used. Any other suitable determine may be used.

While portions illustrated in FIG. 1 are shown as individual modules or components that implement various features and functionality, alternative implementations may be implemented using the described solution. The illustrated components and their functionality may be replaced with alternative, additional, or combined components in other instances.

Figure 2:
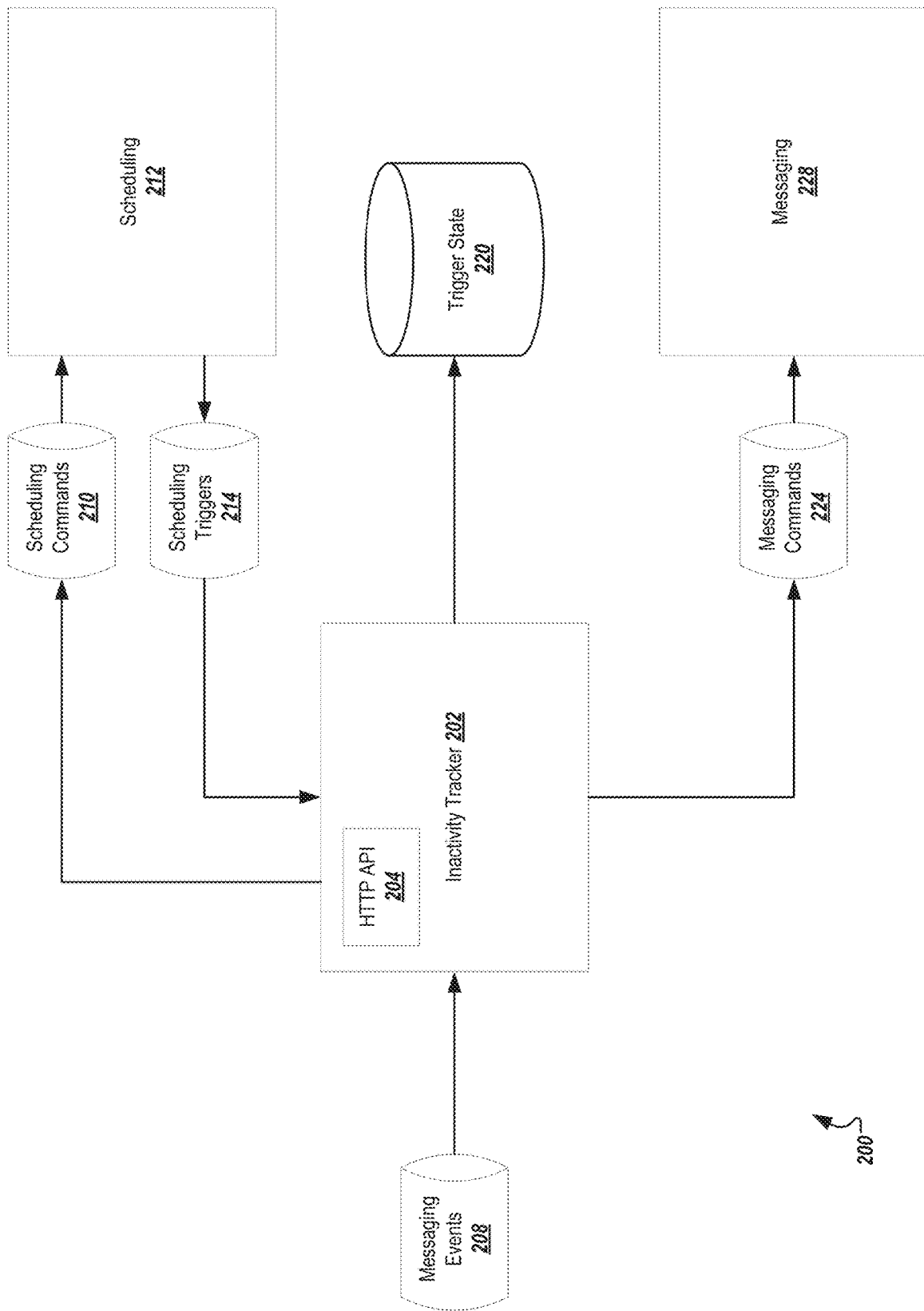
FIG. 2 represents a high-level architecture for the centralized messaging system in one example implementation.

FIG. 2 comprises a high-level architecture for the centralized messaging system in one implementation. As illustrated, three microservices, an inactivity tracker microservice 202, a scheduling microservice 212, and a messaging microservice 228, combine to perform at least some of the functionality associated with the system 200 and the automated messaging operations. In alternative implementations, the components may be applications, services, agents, and other software and hardware-based solutions or components.

The inactivity tracker 202 handles the messaging logic described in the other figures herein, including the determination of when an inactivity timer has expired and how and when to trigger one or more messages in response. The scheduling microservice 212 can be used to determine, for different contacts, when follow-up and additional messages should be initiated based on the inactivity timer data. The messaging microservice 228 can receive a set of messaging commands 224 associated with a particular contact or conversation, and can generate and transmit a corresponding message to the contact.

Messaging events 208 can be received at, intercepted by, or accessed by the inactivity tracker 202 from one or more messaging and interaction sources. The messaging events 208 can be include, but are not limited to, emails, text messages, social media interactions (e.g., public or messaging), phone call indications or information, calendar-related information, as well as other suitable information. Messaging events 208 can be forwarded to system 200 by event emitters from appropriate services, such as an application executing on a mobile device associated with the user, one or more services or social networks, or by any other suitable services or means. Further, the system 200 may include functionality to, periodically or in response to particular events, access one or more services or repositories where messaging and interaction information may be stored or available. That accessed information can then be imported into the system 200 and used as part of the conversation and contact interaction tracking described herein.

As illustrated, the inactivity tracker 202 includes an HTTP API 204, which can be used to read, access, modify, and store configuration information. In some instances, an application or web page associated with the inactivity tracker 202 can allow users to manipulate settings related to inactivity actions, scheduled triggers and parameters for different contacts and conversations, particular messaging information, and other related data associated with the inactivity tracking.

The inactivity tracker 202 can be associated with a relational database or other storage mechanism storing information about the trigger states 220 of particular conversations and contact interactions. In some instances, a history of interactions may also be stored. The trigger state 220 may include a last interaction time, as well as an updated inactivity timer. The inactivity tracker 202 can compare the current state of the trigger state 220 to one or more scheduling commands 210 that define when follow-up messages are to be sent. When a particular inactivity threshold is met or exceeded, the scheduling microservice 212 and/or the inactivity tracker 202 can determine that a message is to be sent, and messaging commands 224 for a particular user, contact, or conversation can be triggered, causing the messaging microservice 228 to generate and send an appropriate message. The scheduling microservice 212 may be used to schedule a certain level or threshold of inactivity at which time a message is to be generated, as well as how often or when to check and monitor the trigger state 220 to determine if the threshold is met. The scheduling commands 210 may be stored at or associated with the scheduling microservice 212, with scheduling triggers 214 being triggered by the scheduling microservice 212 based on those commands 210. In some instances, different scheduling and messaging settings may be applied to different contacts and/or conversations.

In some implementations, messages may be obtained, used, and monitored from Facebook, Twilio, and GraphQL. Messages from those sources can be provided to or accessed by the messaging service, which includes routing functionality, an orchestrating response function, and a number detection service (e.g., where a connection is made to a unique identifier associated with a particular registered user of the centralized messaging system). Additionally, contact information may be received from a core service associated with a list of contacts for a particular registered user.

The system can be capable of performing the operations described in connection with this disclosure, particularly enforcement of and operations related to any inactivity-based rule for continuing and managing conversations with one or more contacts or communication targets. The system can receive and/or access communications from multiple locations and/or platforms, and use that information to provide a unified inbox. Messages can be stored for later use. Services and functionality can be used to determine an inactivity period across a plurality of communication channels as that inactivity relates to a particular contact or communication target. Based on contact-specific (or group-specific) inactivity rules, in response to a particular inactivity period being exceeded, new messages can be generated to restart or initiate further interaction with those particular contacts. Such interactions can be sent to any of the connected communication channels, where particular channels for the automatically generated messages are determined based on a dynamic analysis of prior interactions with the contact, one or more user or contact preferences, and/or other determinations or rules.

Figure 3:
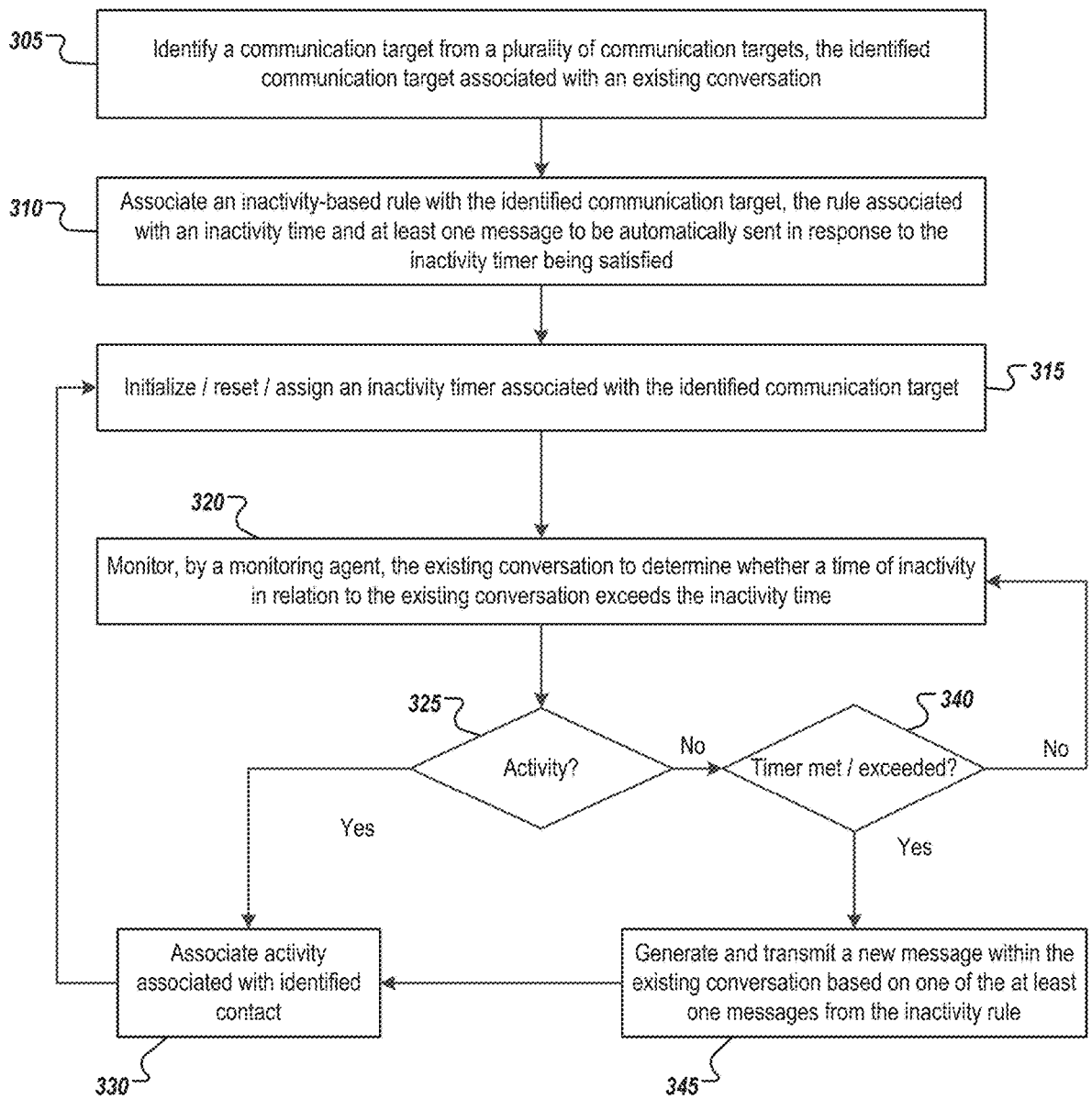
FIG. 3 is a flowchart of an example method for monitoring one or more conversations associated with at least one identified contact of a registered user.

FIG. 3 is a flowchart of an example method for monitoring one or more conversations associated with at least one identified contact of a registered user. Upon identifying that a particular inactivity threshold is met or exceeded in association with a particular conversation, automatically and without user input generating and transmitting a new message to at least one communication channel or endpoint associated with the contact of the particular conversation. It will be understood that method 300 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 300. In some implementations, the method 300 and related methods are executed by one or more components of the system 100 described above with respect to FIG. 1.

At 305, a communication target is identified from a plurality of communication targets, where the identified communication target is associated with an existing conversation. Each communication target may be a contact of the registered user, who may be involved in one or more conversations with different contacts. The conversations may be performed across a single communication channel, or the conversations may be collated or combined sets of interactions across two or more communication channels (e.g., both SMS and Facebook interactions). As described herein, the centralized messaging system can allow different communication channels to be combined into a single, unified inbox. As noted, the identified communication target is associated with an ongoing conversation across one or more of those communication channels.

At 310, a signal or interaction may be received associated with the centralized messaging system (e.g., via a mobile app associated with the system, via a cloud-based web page interaction, via a desktop request, etc.) to associate an inactivity-based rule with the identified communication target. The inactivity-based rule can include or be associated with an inactivity time and at least one message to be automatically sent in response to the inactivity time being satisfied. The at least one message can be a default message or set of messages, one or more customized messages defined by the registered user, messages specific to the contact (i.e., the communication target) or a role, position, or relative relationship of the contact, or any other suitable message. The messages can be set in a particular order, may build upon or relate to one another, or may be other internal relations. In some instances, at least a portion of the message may be dynamically generated at a time when the message is triggered. In some instances, the message may include a calendar invite or other event request or invitation, where appropriate.

At 315, an inactivity time can be initialized or reset and associated with the identified communication target. In some instances, the initialization may be set to a current inactivity time of zero (0), while in other instances, the time may be evaluated based on a last interaction and set to a value matching the time since the last communication or interaction with the identified communication target.

At 320, a monitoring agent associated with the centralized messaging system can monitor the existing conversation with the identified communication target to determine whether a time of inactivity in relation to the existing conversation exceeds the inactivity time defined in the inactivity-based rule. The monitor can monitor any communication channels associated with the identified communication target. In some instances, additional communication channels, such as voice-based channels, may be monitored as well for interactions. Similarly, calendars associated with one or both the registered user and the identified communication target may be monitored to see if meetings or interactions between the parties has occurred. Still further, social networks may be monitored for potential activities, events, check-ins, and interactions that may occur which could be identified or associated with an interaction between the user and target.

At 325, a determination is made as to whether any activity between the user and the identified communication target is monitored. In some instances, whether activity between the user and the identified communication target is identified is not the only determination. In some instances, the type of communication, the quality of the activity, and/or the relevance of the activity may be weighed, considered, or otherwise scored. In those instances, if the activity qualifies above a scoring or weighted threshold, then the activity may be considered to occur to satisfy the determination. If the activity is scored or evaluated below that threshold, then the activity is not considered to have occurred such that the determination is met. If the determination is met and an activity or interaction is considered to have occurred, then method 300 continues at 330, where the monitored activity is associated with the target. Method 300 then returns to 315, where the inactivity time is initialized or reset (or, alternatively, decremented or otherwise lessened depending on the quality of the interaction) based on the monitored activity. If, however, no activity is monitored, method 300 continues to 340, where a determination is made as to whether the inactivity timer is met or exceeded based on the current time of inactivity. If not, method 300 returns to 320 for additional monitoring operations.

If, however, the inactivity timer is exceeded, method 300 continues to 345, where a new message from the at least one message associated with the inactivity-based rule is automatically generated and subsequently transmitted. The operations of 345 can typically be performed automatically and without user input, allowing the message to be sent without requiring confirmation or review by the registered user. The particular message to be generated may be randomly selected from the at least one messages, sequentially selected from the list of messages (e.g., to avoid potentially repetitive messages), or based on any suitable algorithm or user selection (e.g., a weighted value applied to different messages). In some instances, the particular message to be generated may be determined dynamically in response to one or more events, contexts, or other suitable reason or basis.

Once generated, the message can be transmitted via any one of the particular communication channels in which the registered user and the identified target have communicated in the past and/or in which both are registered users. In some instances, the message may be transmitted with the last communication channel used by the participants. In some instances, a contact may be associated with a preferred method of communication, either as explicitly selected by the registered user or by the target if they are also associated and registered with the centralized messaging system, or as implicitly or dynamically determined based on an analysis of prior conversations between the registered user and the target, or by the target and other registered users. The generated message can be transmitted at 345. Once transmitted, the activity of the sent message can be associated with the identified contact at 330, and method 300 can continue to 315 where the inactivity timer can be reset.

In some instances, an initially set inactivity timer for an inactivity-based rule can be analyzed and dynamically modified (or suggested to be modified) based on conversation analytics. If the participants regularly correspond with one another, a smaller inactivity timer may be used. If the participants are irregular contacts, higher inactivity timers may be appropriate. In still other instances, different calendar periods may be associated with different inactivity periods, such as during busier seasons for a particular industry or user. The inactivity timers may be based on and dynamically adapted based on this knowledge and/or analytics received over time.

Figure 4:
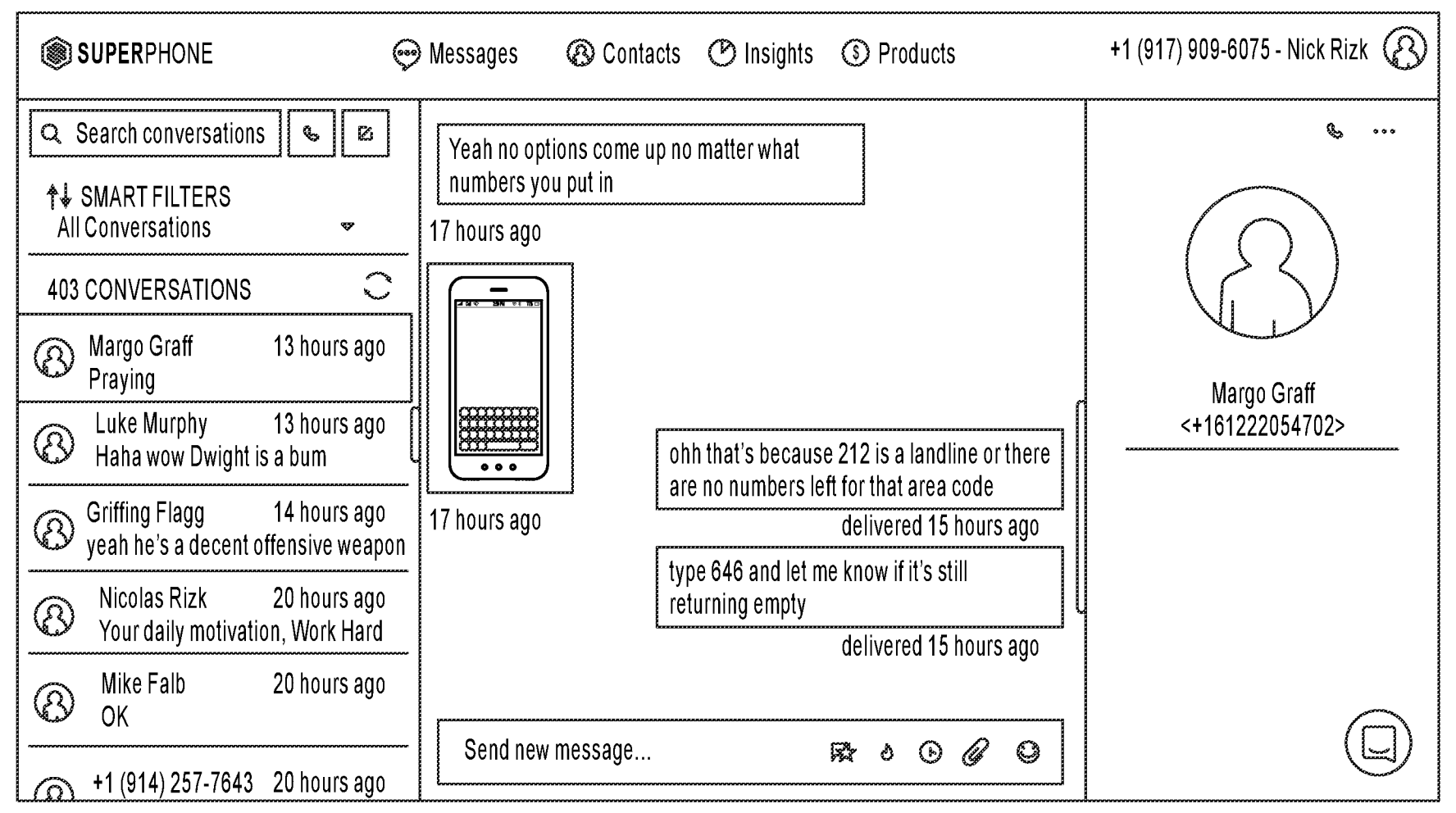

FIGS. 4-13 illustrate example screenshots associated with the described solution. FIG. 4 illustrates a particular conversation being selected and a conversation view being presented. Multiple conversations associated with different communication targets (and across different communication channels) can be available to be viewed. As illustrated, the registered user can select a particular communication target (i.e., contact) associated with a conversation and review and participate in the conversation.

Figure 5:
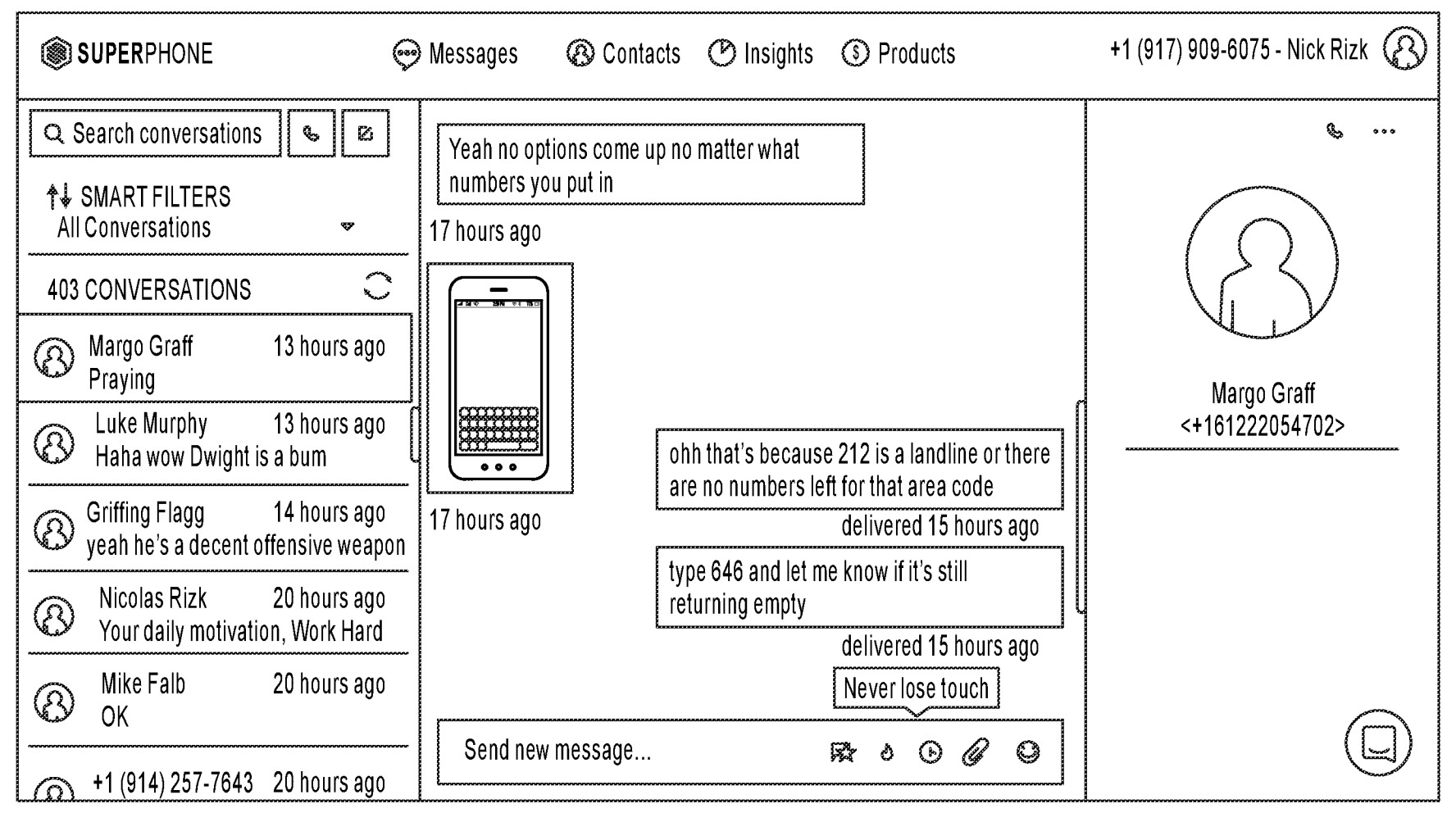
Figure 6:
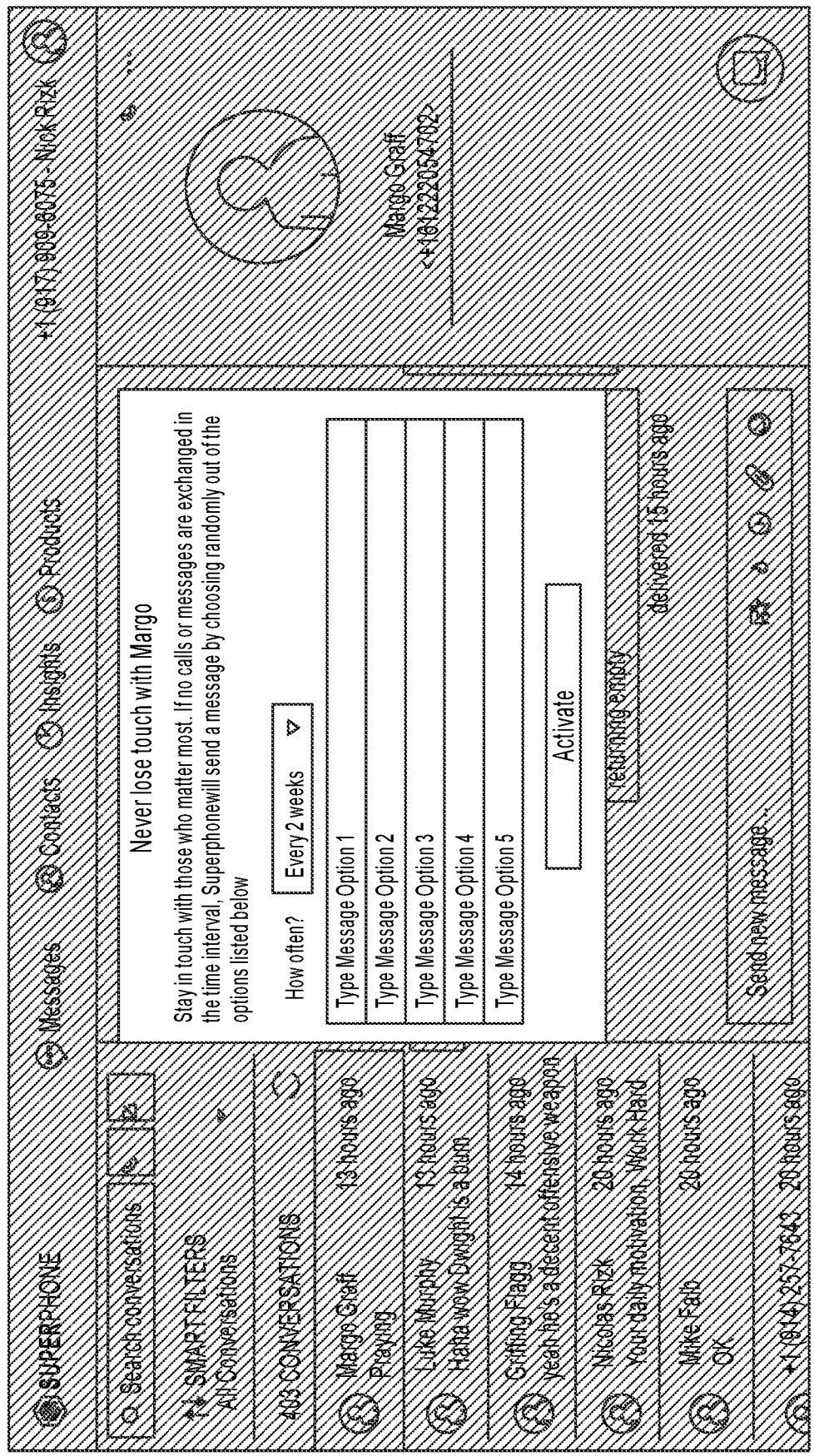
Figure 7:
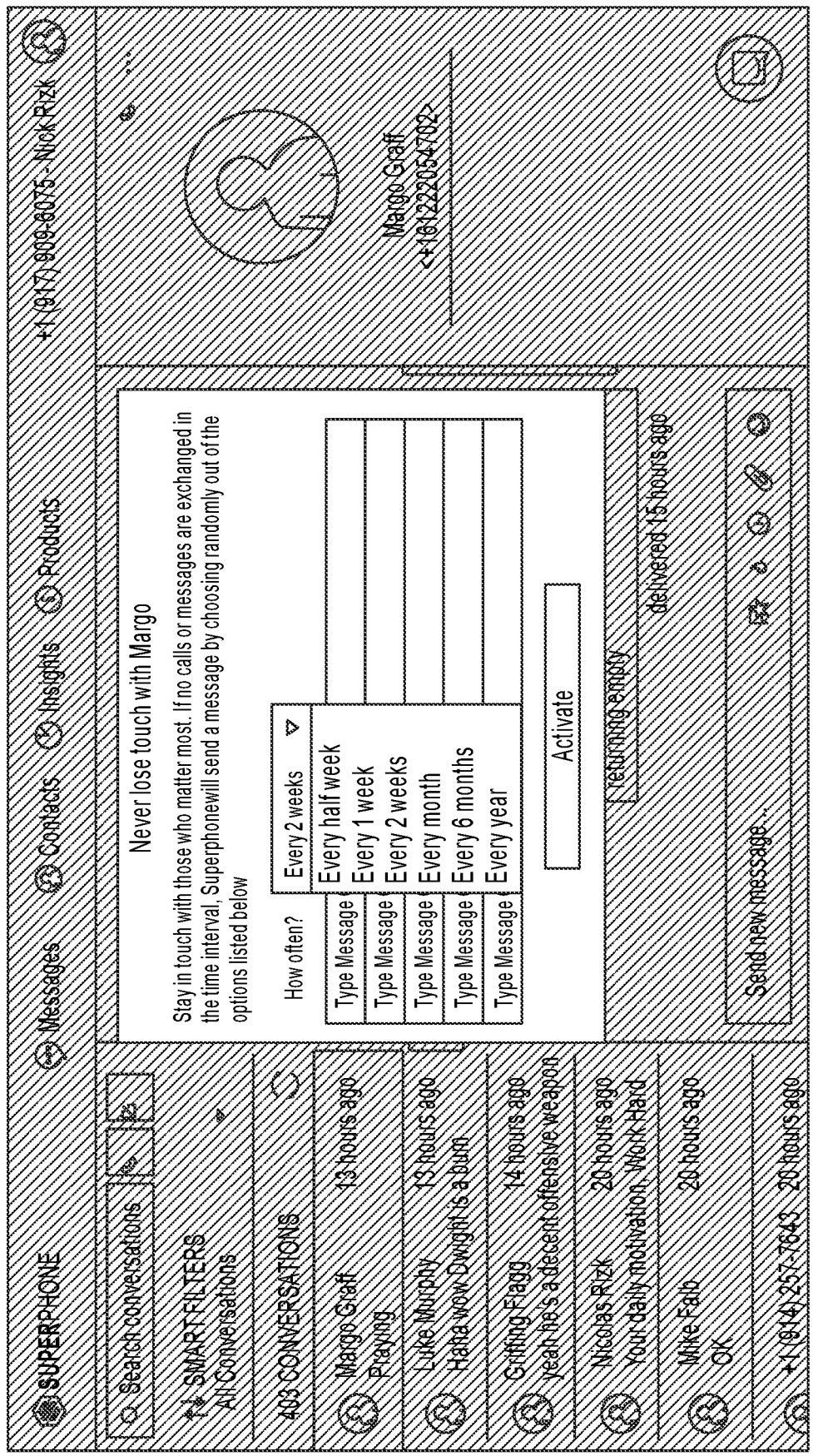
Figure 8:
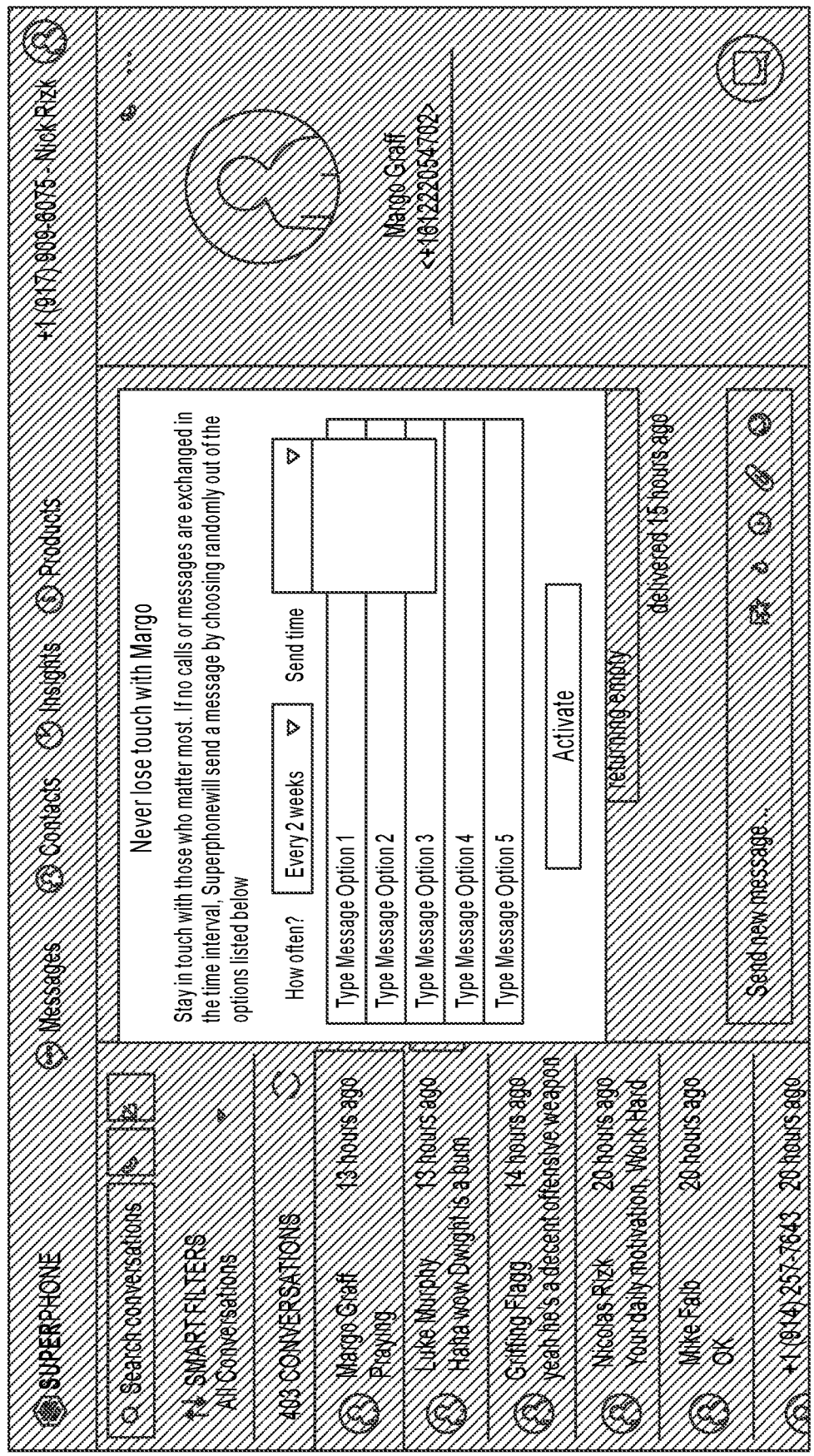
Figure 9:
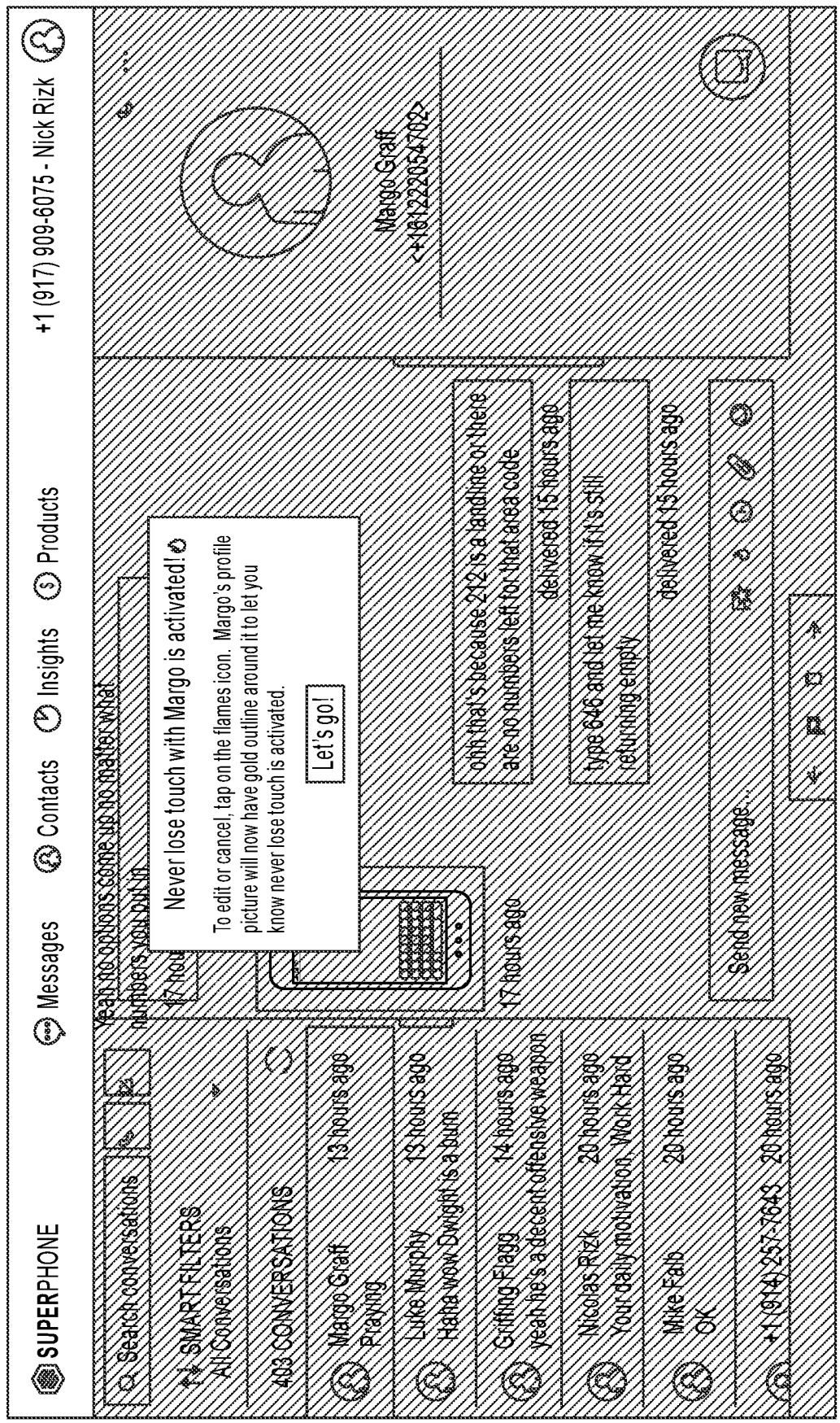
Figure 10:
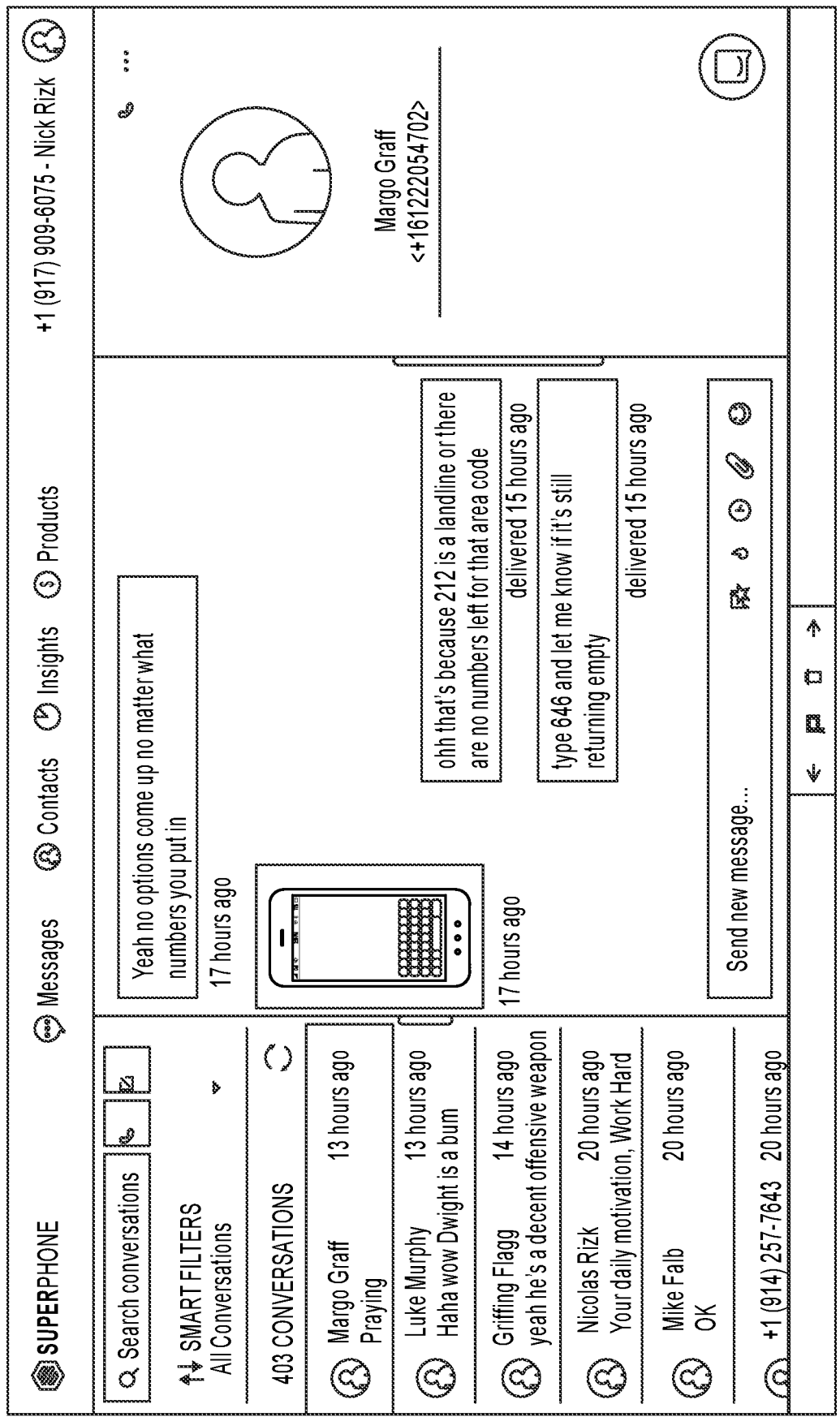
Figure 11:
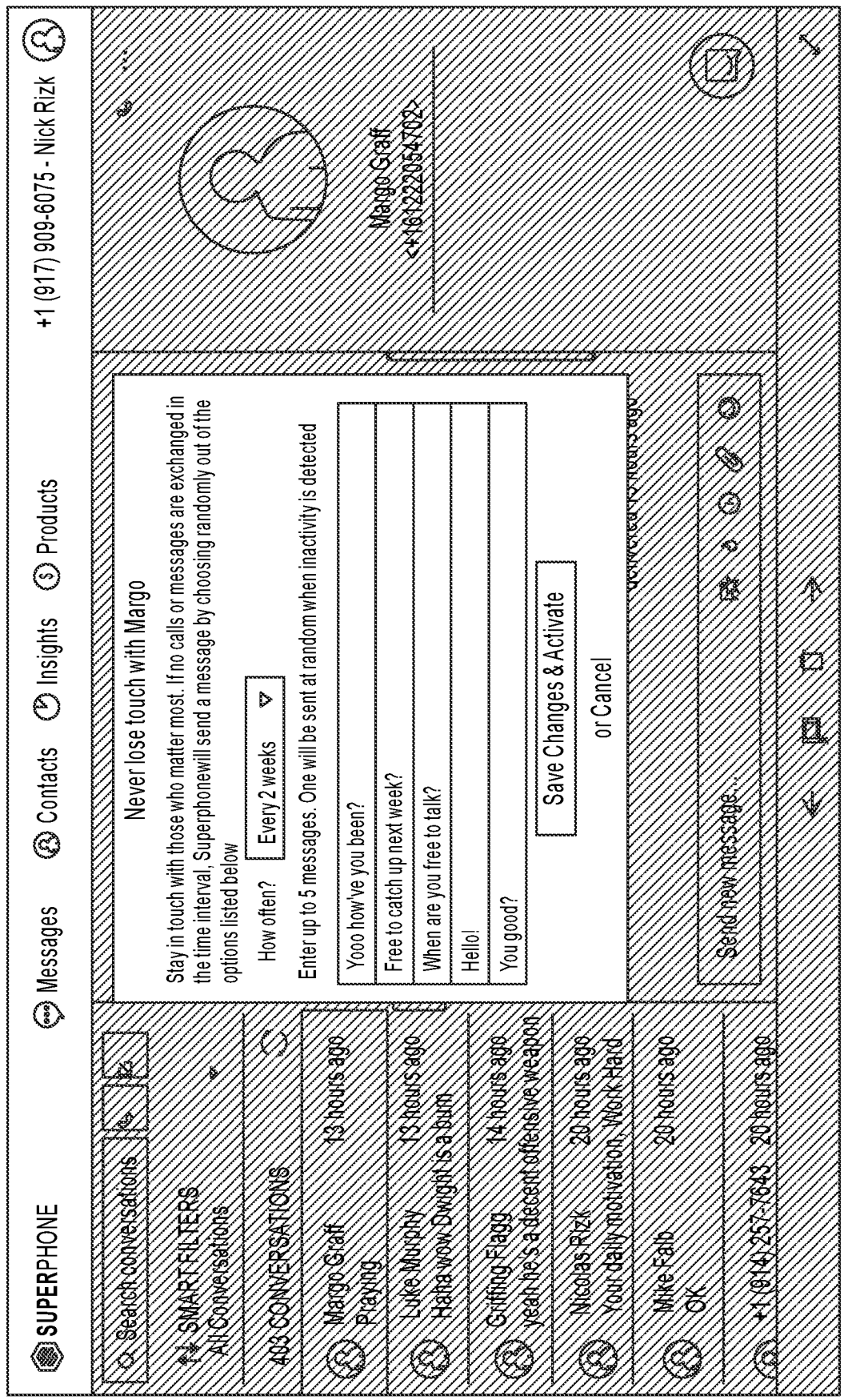
Figure 12:
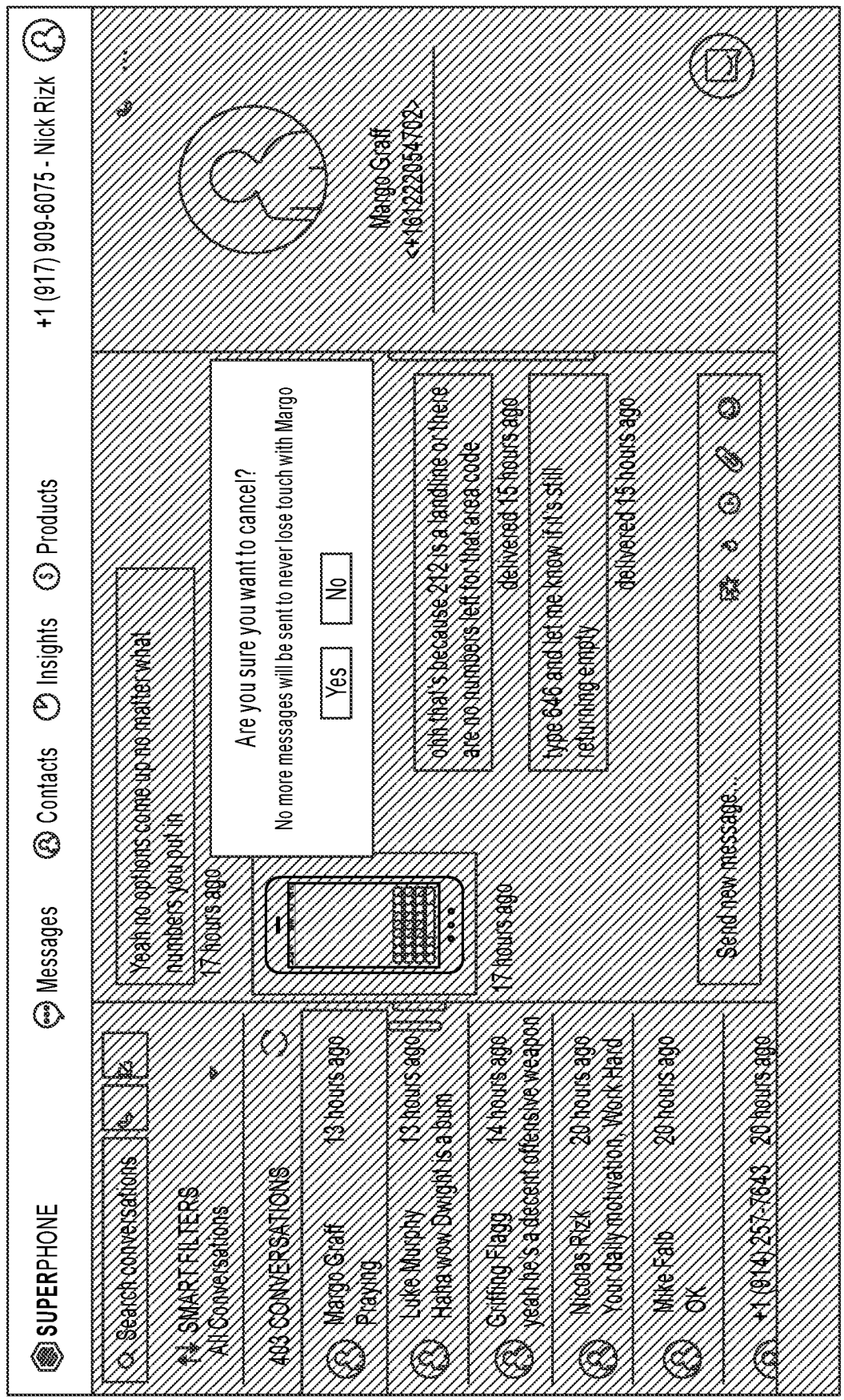
Figure 13:
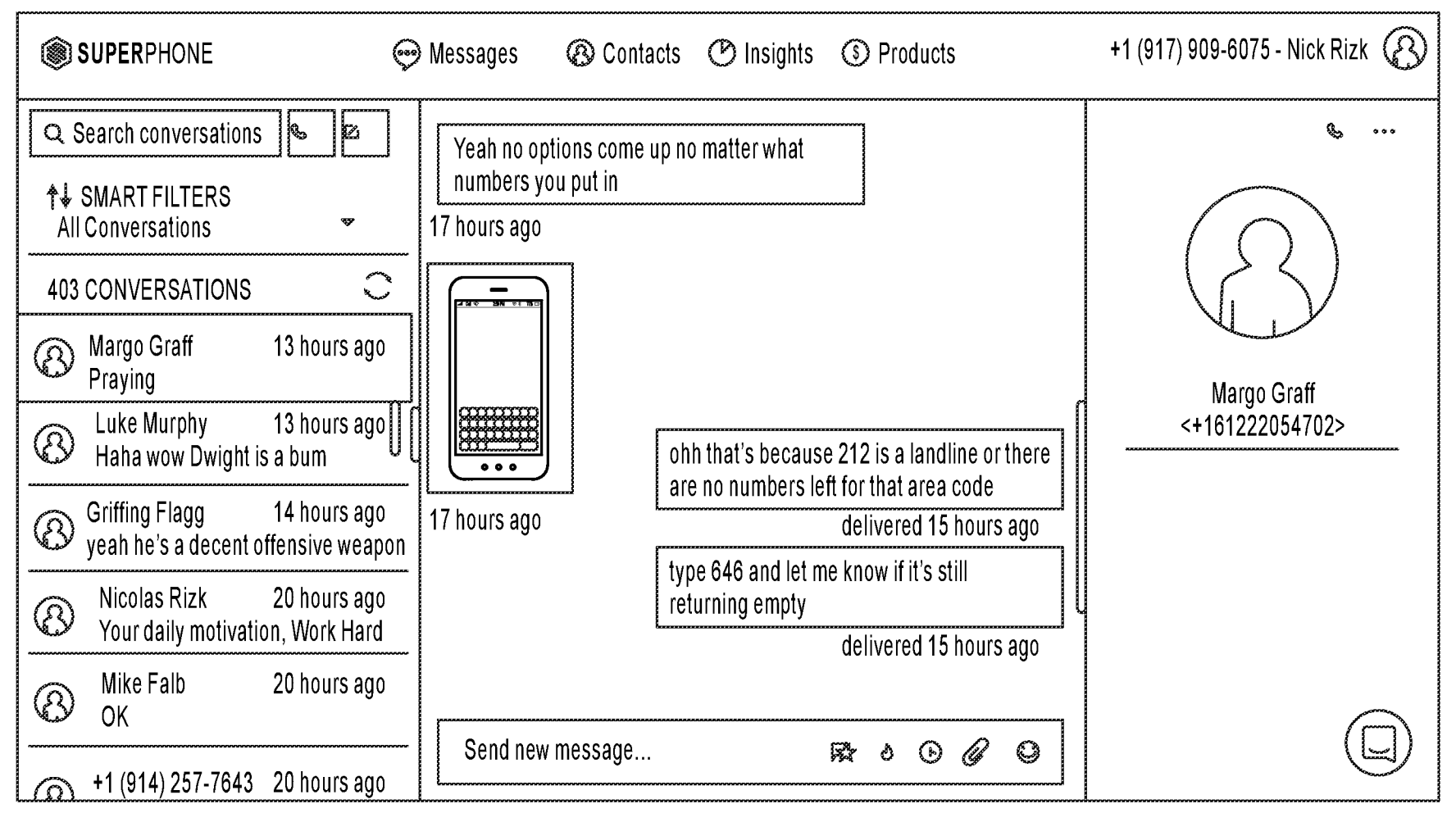

FIG. 5 shows a "Never Lose Touch" control being hovered over prior to being selected. The functionality associated with the inactivity timer can be initiated in any suitable manner. The illustration of this control is not meant to be limiting, but an example for potential implementations. FIG. 6 shows an example interface after selection of the control in the example. Here, an input box associated with an inactivity time for the identified contact allows the inactivity-based rule to be defined. FIG. 7 illustrates a particular interval for inactivity to be set, and includes several example times. In some instances, custom times may also be used. In some instances, a dynamic time may be determined, where the dynamic time is based on an analysis of prior conversations between the registered user and the identified contact, where the dynamic time is based on normal contact periods and inactivity periods. FIG. 8 illustrates where the registered user can input one or more example messages to the identified contact. Some may be default messages, while others may be customized. FIG. 9 illustrates a confirmation box confirming the registered user wants to initiate the inactivity rule. FIG. 10 illustrates the example UI once the option has been confirmed. Here, an outline may be presented around the contact image of the identified contact in the conversation list (to the left) as well as in the right panel when the conversation is selected. Any suitable emphasis or identifier may be used in other implementations, while in some instances, no identifier may be used or presented. FIG. 11 illustrates where the registered user can update or modify the inactivity rule (either the interval, the messages, or both), while FIG. 12 shows an interface corresponding to the cancellation of the inactivity rule. FIG. 13 illustrates that after the rule is cancelled, the example outline is removed from the identified contact's information.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The preceding figures and accompanying description illustrate example processes and computer implementable techniques. But the environment (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure

What is claimed is:

1. A system, comprising:
one or more processors; and
a computer-readable storage device coupled to the one or more processors and having instructions stored thereon which, when executed by the one or more processors, cause the one or more processors to perform operations comprising:
identifying a communication target from a plurality of communication targets, the identified communication target associated with an existing conversation, wherein the communication target is associated with a plurality of channels of communication, and wherein the existing conversation involves interactions via at least two of the plurality of channels of communication associated with the communication target;
associating an inactivity-based rule with the identified communication target and the associated existing conversation, wherein the inactivity-based rule is associated with an inactivity time threshold and at least one message, wherein the inactivity time threshold is initially set by a user, and wherein the inactivity time threshold is updated after the initial setting based on an analysis of interactions of the user with communication targets other than the identified communication target;
monitoring ongoing activity associated with the existing conversation across the plurality of channels of communication associated with the identified communication target to determine whether a time of inactivity for the existing conversation exceeds the inactivity time threshold of the inactivity-based rule based on a lack of interaction on each of the plurality of channels of communication associated with the identified communication target; and
in response to determining that the time of inactivity exceeds the inactivity time threshold of the inactivity-based rule, automatically and without user input:
generating a new message within the existing conversation to the identified communication target based on the at least one message of the inactivity-based rule; and
transmitting the generated new message to the identified communication target.

2. The system of claim 1, the operations further comprising, in response to transmitting the generated new message, resetting the time of inactivity associated with the existing conversation.

3. The system of claim 1, the operations further comprising, in response to detecting new activity associated with the existing conversation, resetting the time of inactivity associated with the existing conversation.

4. The system of claim 1, wherein the inactivity time threshold is updated after the initial setting based on an analysis of historical interactions of the user with the identified communication target.

5. The system of claim 1, wherein at least a first communication target and a second communication target are associated with different inactivity time thresholds.

6. The system of claim 1, wherein monitoring ongoing activity associated with the existing conversation across the plurality of channels of communication associated with the identified communication target comprises managing a unified inbox for a user, where the unified inbox collects interactions performed for each of the plurality of communication channels associated with the identified communication target.

7. A computer-implemented method, comprising:
identifying a communication target from a plurality of communication targets, the identified communication target associated with an existing conversation, wherein the communication target is associated with a plurality of channels of communication, and wherein the existing conversation involves interactions via at least two of the plurality of channels of communication associated with the communication target;
associating an inactivity-based rule with the identified communication target and the associated existing conversation, wherein the inactivity-based rule is associated with an inactivity time threshold and at least one message, wherein the inactivity time threshold is initially set by a user, and wherein the inactivity time threshold is updated after the initial setting based on an analysis of interactions of the user with communication targets other than the identified communication target;
monitoring ongoing activity associated with the existing conversation across the plurality of channels of communication associated with the identified communication target to determine whether a time of inactivity for the existing conversation exceeds the inactivity time threshold of the inactivity-based rule based on a lack of interaction on each of the plurality of channels of communication associated with the identified communication target; and
in response to determining that the time of inactivity exceeds the inactivity time threshold of the inactivity-based rule, automatically and without user input:
generating generate a new message within the existing conversation to the identified communication target based on the at least one message of the inactivity-based rule; and
transmitting transmit the generated new message to the identified communication target.

8. The method of claim 7, further comprising, in response to transmitting the generated new message, resetting the time of inactivity associated with the existing conversation.

9. The method of claim 7, further comprising, in response to detecting new activity associated with the existing conversation, resetting the time of inactivity associated with the existing conversation.

10. The method of claim 7, wherein the inactivity time threshold is updated after the initial setting based on an analysis of historical interactions of the user with the identified communication target.

11. The method of claim 7, wherein at least a first communication target and a second communication target are associated with different inactivity time thresholds.

12. The method of claim 7, wherein monitoring ongoing activity associated with the existing conversation across the plurality of channels of communication associated with the identified communication target comprises managing a unified inbox for a user, where the unified inbox collects interactions performed for each of the plurality of communication channels associated with the identified communication target.

13. A system, comprising:
one or more processors; and a computer-readable storage device coupled to the one or more processors and having instructions stored thereon which, when executed by the one or more processors, cause the one or more processors to perform operations comprising:
identifying a communication target from a plurality of communication targets, the identified communication target associated with an existing conversation, wherein the communication target is associated with a plurality of channels of communication, and wherein the existing conversation involves interactions via at least two of the plurality of channels of communication associated with the communication target;
associating an inactivity-based rule with the identified communication target and the associated existing conversation, wherein the inactivity-based rule is associated with an inactivity time threshold and at least one message, wherein the inactivity time threshold is initially set to an initial value by a user, and wherein the inactivity time threshold is updated after the initial setting based on an analysis of interactions of the user with communication targets other than the identified communication target;
monitoring ongoing activity associated with the existing conversation across the plurality of channels of communication associated with the identified communication target to determine whether a time of inactivity for the existing conversation exceeds the inactivity time threshold of the inactivity-based rule based on a lack of interaction on each of the plurality of channels of communication associated with the identified communication target; and
in response to determining that the time of inactivity exceeds the inactivity time threshold of the inactivity-based rule, automatically and without user input:
generating a new message within the existing conversation to the identified communication target based on the at least one message of the inactivity-based rule; and
transmitting the generated new message to the identified communication target.

* * * * *